United States Patent [19]

Sano et al.

[11] 4,132,938

[45] Jan. 2, 1979

[54] PLAYBACK TYPE INDUSTRIAL ROBOT

[75] Inventors: Sinitiro Sano, Yokohama; Noriaki Kuroda, Omiya; Tsuyoshi Sakai, Yokohama, all of Japan

[73] Assignee: Tokico Limited, Kawasaki, Japan

[21] Appl. No.: 783,727

[22] Filed: Apr. 1, 1977

[30] Foreign Application Priority Data

Apr. 19, 1976 [JP] Japan .................................. 51-44812

[51] Int. Cl.² ............................................ G05B 19/42
[52] U.S. Cl. .................................. 318/568; 318/625
[58] Field of Search ......................... 318/568, 162, 625

[56] References Cited

U.S. PATENT DOCUMENTS

| | | | |
|---|---|---|---|
| 3,885,207 | 5/1975 | Bosque et al. ........................ | 318/568 |
| 3,906,323 | 9/1975 | Ono et al. ......................... | 318/625 X |
| 3,934,186 | 1/1976 | Hayakawa et al. .............. | 318/162 X |
| 4,025,838 | 5/1977 | Watanabe ............................ | 318/568 |

*Primary Examiner*—B. Dobeck
*Attorney, Agent, or Firm*—Haseltine, Lake & Waters

[57] ABSTRACT

A playback type of industrial robot in which displacement of a movable part is detected and a position detection signal is generated. This signal is stored in a memory, and the driving of the movable part is controlled as a function of the signal read out of the memory. The control unit for controlling the memory operation, has applied to it a teaching mode signal. The control unit has also applied to it a playback mode signal. The control unit which is responsive to the playback signal, produces a signal to result in readout of the memory and to set the drive for the movable part into an operative state.

7 Claims, 8 Drawing Figures

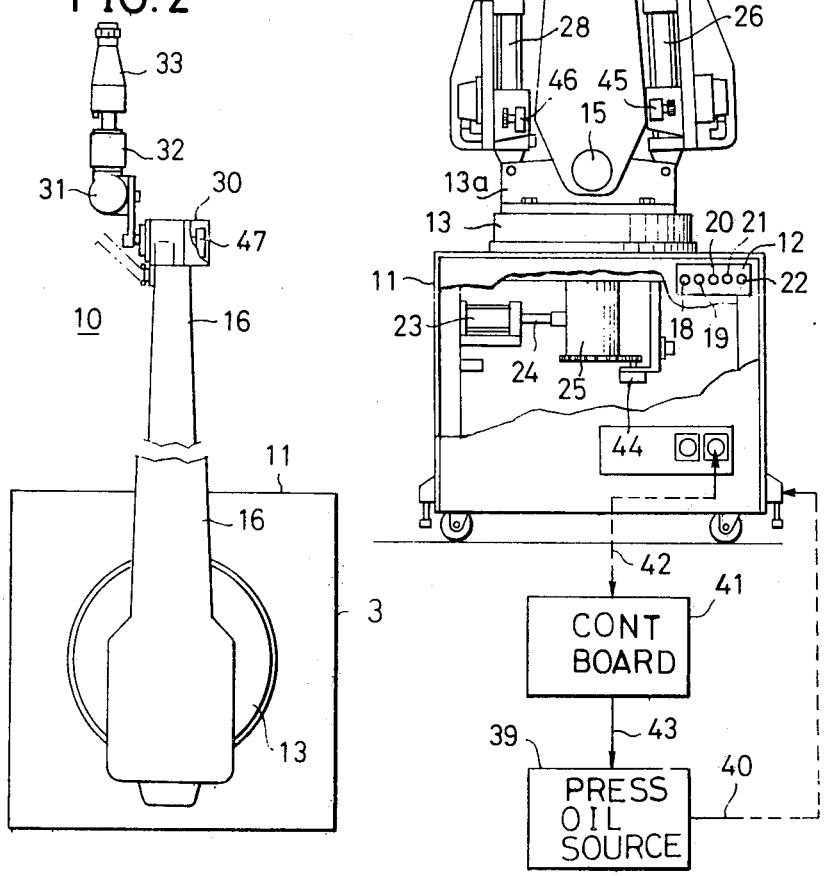

PLAYBACK TYPE INDUSTRIAL ROBOT

BACKGROUND OF THE INVENTION

The present invention relates generally to industrial robots of playback type and more particularly to a playback type industrial robot wherein a teaching operation for causing a memory apparatus to memorize working contents can be revised or corrected halfway.

In general, the playback type industrial robot is so adapted that the moving or displacing operation of a movable part may be memorized or taught in the memory apparatus by moving manually the movable part by an operator, and that, in a normal playback operation mode, the movable part operates or moves automatically in accordance with the memorized or taught contents. Accordingly, the playback type industrial robot is not necessitated to arrange a working program through the use of devices such as a pin-board. Therefore, the robot of this type has the advantage that the working contents can be easily and accurately memorized or preset.

The playback type industrial robot known heretofore employs a magnetic tape as a recording medium of the memory apparatus, and is adapted so as to rewind the magnetic tape automatically after a completion of teaching operation. In the case where the teaching operation involves some errors during the teaching and the operation of erroneous contents has been resultingly memorized, the conventional playback type industrial robot has required to be taught again the whole teaching contents from the beginning thereof. Accordingly, the conventional industrial robot is accompanied with difficulties that, when an error of the teaching operation occurs during the teaching operation, the longer period of time is required for correcting or re-teaching operation, and the labor of the operator thereby increases. The above described difficulties become more serious, particularly in the case where the teaching contents is of complicated and the time for teaching operation is thereby long.

SUMMARY OF THE INVENTION

Accordingly, it is a general object of the present invention to provide a novel and useful playback type industrial robot in which the above described difficulties have been overcome.

Another object of the invention is to provide a playback type industrial robot which is so adapted that, in the case where the teaching operation involves an error during the operation of causing the memory apparatus to memorize the working contents, the contents thus erroneously memorized can be corrected into the correct teaching contents from the intermediate point of the teaching operation.

Another object of the invention is to provide a playback type industrial robot in which manipulation switches relating to the teaching operation are disposed at the robot structure side so as to carry out easily the teaching operation.

Still another object of the invention is to provide a playback type industrial robot wherein an operation for reading out the teaching contents from the memory apparatus is carried out in a manner of greatly reducing the occurence of read errors.

Other objects and further features of the present invention will be apparent from the following description set forth in conjunction with the accompanying drawings.

BRIEF DESCRIPTION OF THE DRAWINGS

In the drawings:

FIG. 1 is an elevation, with a part cut away, showing one embodiment of a robot structure of a playback type industrial robot according to the present invention;

FIG. 2 is a plan view of the robot structure shown in FIG. 1;

DETAILED DESCRIPTION

Figure 3:
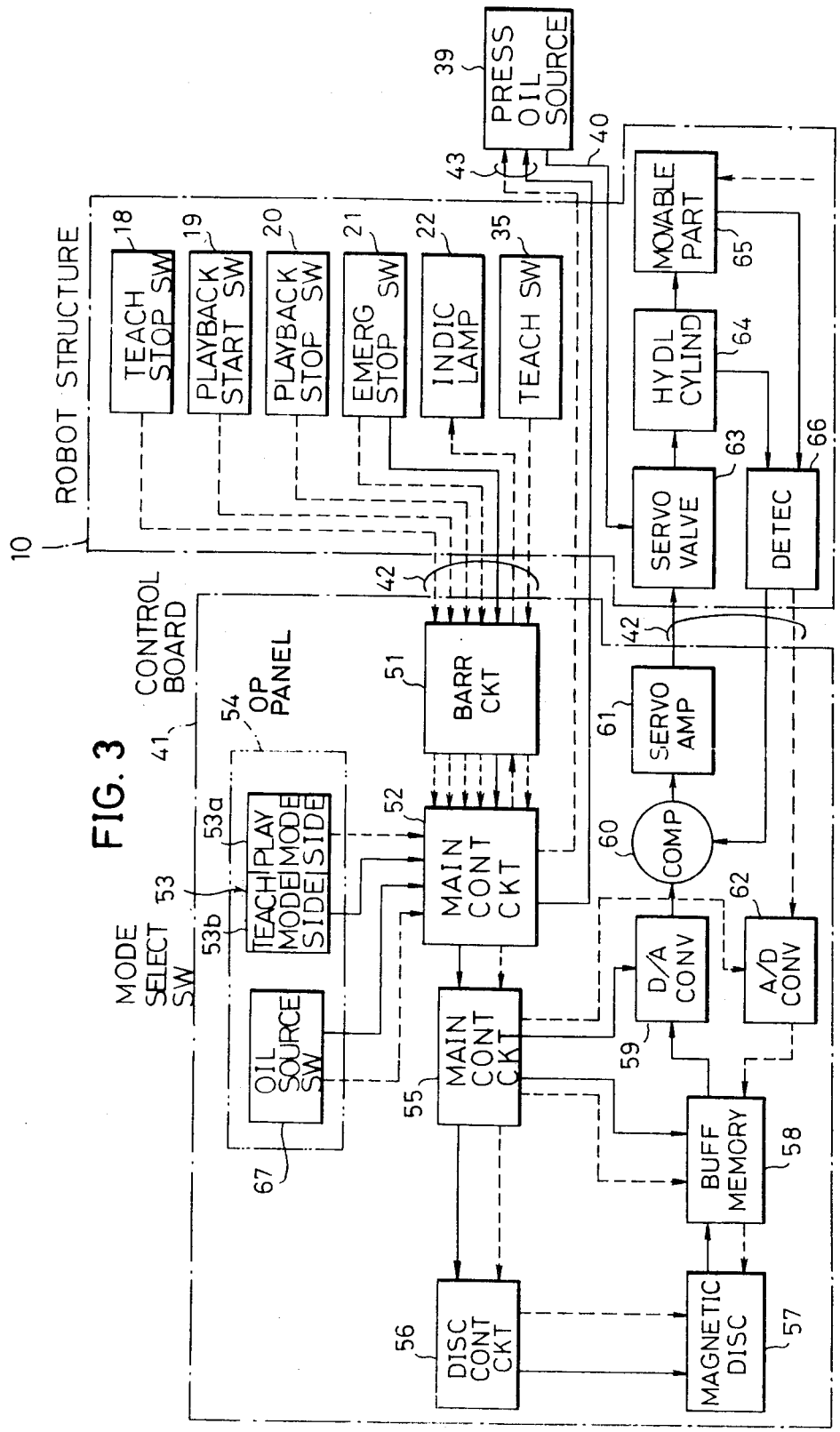
FIG. 3 is a block systematic diagram of an operation control system for controlling the robot structure shown in FIG. 1.

Referring to FIG. 1 and FIG. 2, one embodiment of a robot structure of a playback type industrial robot according to the present invention is described. A robot structure 10 is used for painting by spraying paint, in this embodiment.

A platform 11 is provided with a manipulation switch-panel 12 at a predetermined position, and a turntable 13 rotatably on the upper surface thereof. A post body 14 is supported its lower end by a shaft 15 in a swingable manner on a movable table 13a mounted unitarily on the turntable 13. At the upper end of the post body 14, an arm 16 is swingably supported by a shaft 17. In the drawings, the arm 16 is shown with a part cut out.

The switch-panel 12 is provided with manipulation switches comprising a teaching stop switch 18, a playback start switch 19, a playback stop switch 20 and an emergency stop switch 21, and an indication lamp 22.

A cylinder 23 is provided in the interior of the platform 11, and a rod 24 thereof is engaged with a part of the peripheral surface of a rotary shaft 25 fixed to the turntable 13. The sliding movement of the rod 24 caused by the cylinder 23 imparts a force to the rotary shaft 25 in the tangent direction thereof, whereby the turntable 13 is rotated unitarily with the rotary shaft 25 in a horizontal plane within a predetermined angular range. A cylinder 26 is hinged, its lower end, to the movable table 13a, and a rod 27 of the cylinder 26 is also hinged, at the upper end thereof, to a bar 14a fixed to the post body 14. The sliding movement of the rod 27 causes the post body 14 to swing to the left and right within a predetermined angular range. A cylinder 28 is hinged, its lower end, to the table 13a, and a rod 29 of the cylinder 28 is also hinged, at the upper end thereof, to a bar 16a fixed to the lower surface of the arm 16. The sliding movement of the rod 29 causes the arm 16 to swing up and down within a predetermined angular range.

Hydraulic rotary actuators 30 and 31 and an air rotary actuator 32 are successively provided at the distal end of the arm 16. Further, a spray gun 33 for painting is mounted at the distal end of the actuator 32. A rightgrip 34a and a left-grip 34b are respectively fixed to the distal end of the arm 16 and the air rotary actuator 32. The grips 34a and 34b incorporate therewithin pushbuttons 36a and 36b for closing teaching switches 35a and 35b (35) respectively. The spray gun 33 is supplied with paints through a pipe 37 and air through a pipe 38.

The hydraulic cylinders 23, 26, and 28, and the hydraulic rotary actuators 30 and 31 are actuated by pressurized oil supplied through a supply pipe 40 from a pressurized oil supply source 39. Respective switches 18 through 21, and the indication lamp 22 on the switch-panel 12, and the switch 35 are electrically connected through an electric wire 42 to a circuit in a control board 41 disposed at a position aparting from the platform 11. The pressurized oil supply source 39 is electrically connected to the control board 41 through an electric wire 43. The switch-panel 12 is disposed at a position outside of the rotating and swinging angular range of the movable parts such as the post body 14 and the arm 16.

The systematic diagram of the control system for actuating the robot structure of the above described construction is described with reference to FIG. 3. In FIG. 3, the parts which are the same as those in FIG. 1 are designated by the like reference numerals and the description thereof is not repeated. In FIG. 3, a dotted arrow line and a full arrow line represent respectively the flow of signals at the time of a teaching operation mode and at the time of playback operation mode.

Respective switches 18 through 21 and the indication lamp 22 on the switch-panel 12, and the switch 35 are connected to a first main control circuit 52 by way of a barrier circuit 51 in the control board 41. The barrier circuit 51 is of a well-known essentially safety explosion proof circuit. The barrier circuit 15 comprises relay coils and relay contacts shielded by insulating plates resistors, and the like. A current supplied to the relay coil and respective switch circuits of the switch panel 12 is restricted to such a small value that the explosion does not occur due to a spark developed by a short of lines of the switch circuits. The control board 41 contains therein an operation panel 54 having a pressurized oil source operation switch 67 and a mode-selecting switch 53 for selecting a teaching mode side 53a or a playback mode side 53b, a second main control circuit 55, a disc control circuit 56, a magnetic disc 57, a buffer memory 58, a digital to analog (D/A) converter 59, a comparator 60, a servo amplifier 61, and an analog to digital (A/D) converter 62, in addition to the above described barrier circuit 51 and the main control circuit 52.

In the robot structure 10, there are provided a servo valve 63, a hydraulic cylinder 64, a movable part 65, a position detector 66. The hydraulic cylinder 64 is indicated as a representative of the cylinders 23, 26, and 28, and the actuators 30 and 31. The movable part 65 is indicated as a representative of parts which are caused to be moved by the hydraulic cylinder 64. The position detector 66 is indicated as a representative of potentiometers 44 through 48 in FIG. 1 which are provided in associated with the above described hydraulic cylinder 64 and movable part 65 and detect moving displacements thereof as changes in voltage.

Figure 4:
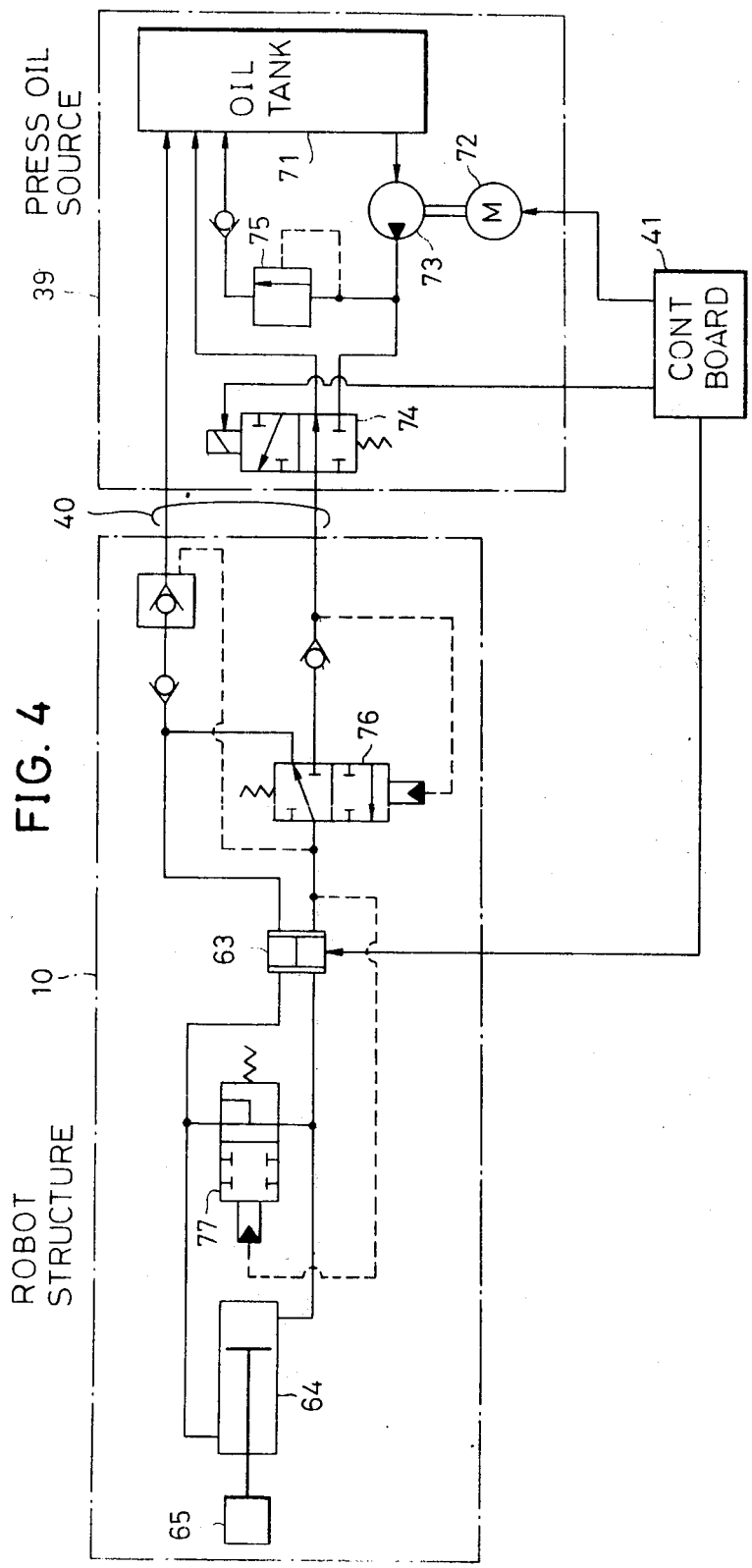
FIG. 4 is a systematic diagram showing a part of a hydraulic system.

A schematic diagram of the hydraulic system is shown in FIG. 4. The pressurized oil supply source 39 comprises an oil tank 71, a pump 73 driven by a motor 72, a solenoid valve 74, a relief valve 75, and the like. The hydraulic system in the robot structure 10 is communicatively connected to the pressurized oil supply source 39 through the pipe 40, and comprises pilot changeover valves 76 and 77, a servo valve 63, a hydraulic cylinder 64, and the like. At appropriate positions along the pipe line, check valves are provided in accordance with the necessity. The teaching operation, normal playback operation, and teaching correcting operation are successively described with reference to FIG. 1 through FIG. 4.

First, preceding to the starting of operation, a pressurized oil supply source operation switch 67 on the operation panel 54 of the control board 41 is rendered "ON". As a result, the main control circuit 52 operate to assume the state wherein the power source is to be supplied to the motor 72 in the pressurized oil supply source 39, whereby the pump 73 is driven to send out oil in its pressurized state from the oil tank 71.

For carrying out the teaching, the mode-selecting switch 53 on the operation panel 54 is switched to the teaching mode side 53a. A teaching operator holds the grips 34a and 34b of the robot structure 10 to manipulate the push buttons 36a and 36b, thereby rendering the teaching switches 35a and 35b (35) into "ON". As a result of it, the solenoid valve 74 in the pressurized oil supply source 39 is closed in response to a signal sent out from the main control circuit 52, whereby the pressurized oil from the pump 73 is prevented from supplying to the robot structure 10 and is therefor relieved through the relief valve 75 into the oil tank 71. The pilot changeover valve 77 provided in the interior of the robot structure 10 serves to communicatively connect two chanbers defined by a piston in the hydraulic cylinder 64. The hydraulic cylinder 64 is not supplied with the pressurized oil, but assumes a state where the piston and rod can be moved freely without any load or resistance.

Figure 5A:
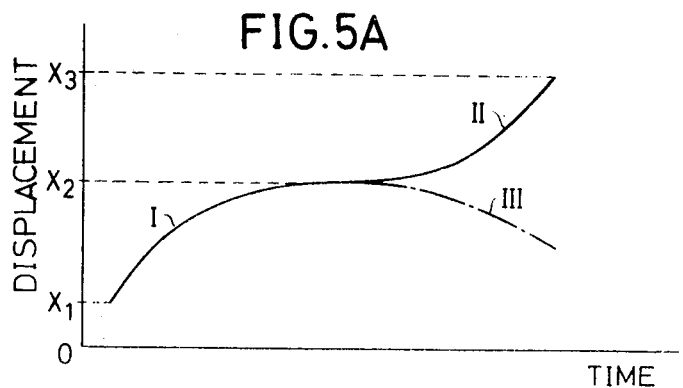
FIG. 5A and FIG. 5B are time charts respectively indicating displacement of a movable part of the robot structure for explaining a teaching operation and a teaching correction operation.

Then, the teaching operator manipulatively moves the movable part 65, with holding the grips 34a and 34b, in such a manner that the spray gun 33 moves in a moving path of a predetermined painting operation, as indicated by curves I and II in FIG. 5A, for instance. The position detector 66 produces the signal corresponding to the displacement of the movable part 65. The produced signal is supplied to the A/D converter 62 provided in the control board 41 and converted thereat from the analog signal to the digital signal. In response to a main control signal from the main control circuit 55 which has been received with the signal from the main control circuit 52, the A/D converter 62 sends out the output digital signal to the buffer memory 58. The buffer memory 58 is controlled by a signal from the main control circuit 55, and operates, during the teaching operation, to store temporarily the signals from the A/D converter 62. Signals sent out from the buffer memory 58 are recorded and memorized on the magnetic disc 57. Here, since the operation speed of the position detector 66 and the memorizing speed of the magnetic disc 57 differ greatly with each other, the buffer memory 58 is provided for the purpose of storing or accumulating the signals temporarily. The magnetic disc 57 is controlled its writing in (recording) and reading out (reproducing) operations by signals from the disc control circuit 56 which is supplied with the signal from the main control circuit 55. The magnetic disc 57 performs its writing in operation at the time of teaching mode.

According to the operation set forth, the movement path of the movable part 65 which has been moved manually by the teaching operator is totally memorized on the magnetic disc 57. After the teaching operation is carried out correctly and is completed, the teaching stop switch 18 is manipulated thereby to record an end mark signal at the end of recording on the magnetic disc 57. During the teaching mode, the indication lamp 22 illuminates thereby indicating that the robot is in the teaching mode.

When the movement thus taught and memorized is to be normally played back or reproduced, the mode-selecting switch 53 of the operation panel 54 is changed over to the reproducing mode side 53b. The main control circuit 52 emits a signal responsive to the switching of the switch 53 to the solenoid valve 74 in the pressurized oil supply source 39. The solenoid valve 74 is then opened to supply the pressurized oil from the pump 73 to the hydraulic cylinder 64 through the servo valve 63 in the robot structure 10.

The signal of the main control circuit 52 is supplied to the main control circuit 55. The disc control circuit 56, in response to the signals from the main control circuit 55, sends out the signal to the magnetic disc 57 thereby causing it to perform the reading out (reproducing) operation. The signal read out from the magnetic disc 57 is supplied to the buffer memory 58, which is controlled by the signal of the main control circuit 55, and is stored or accumulated temporarily thereat.

The digital signal read out successively from the buffer memory 58 is supplied to the D/A converter 59, which is operated by the signal from the main control circuit 55, and is converted to the analog signal thereat. This output analog signal is supplied to the comparator 60, where it is compared with the signal from the position detector 66. The output error signal of the comparator 60 is amplified by the servo amplifier 61, and is then applied to the servo valve 63 to control it. The servo valve 63 operates to control the flow and quantity of the pressurized oil to be supplied to the hydraulic cylinder 64 in accordance with the signal thus applied.

The movements of the hydraulic cylinder 64 and the movable part 65 are always fed back to the comparator 60 by the position detector 66, whereby the hydraulic cylinder 64 always operates in correspondence to the signal read out from the magnetic disc 57. Consequently, the movable part 65 moves automatically along the taught movement indicated by curves I and II in FIG. 5A.

The teaching correction operation which now becomes possible by the present invention is described hereinafter.

The mode-selecting switch 53 is switched to the teaching mode side 53a, and then, the teaching operation is carried out in the teaching mode, as described hereinbefore. Here, it is assumed that the displacement of the movable part 65 between positions X1, X2, and X3 as indicated by the curves I and II in FIG. 5A, in which the time and the displacement of the movable part 65 are respectively indicated by the abscissa and ordinate, should be taught. It is further assumed that the movable part 65 is erroneously displaced as indicated by curves I and III, thereby to be taught or memorized in the magnetic disc 57 just as it has been erroneously displaced.

Figure 5B:
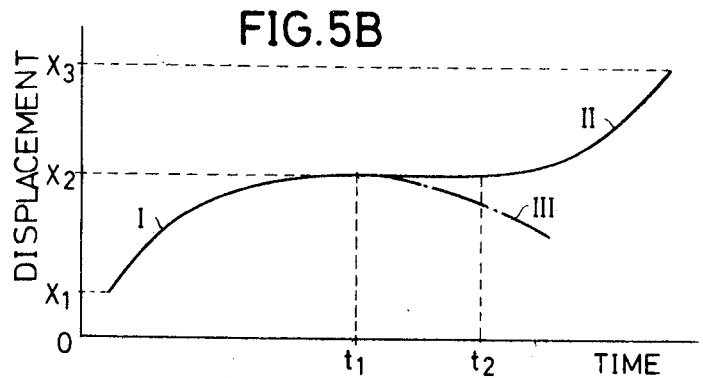
Figure 6:
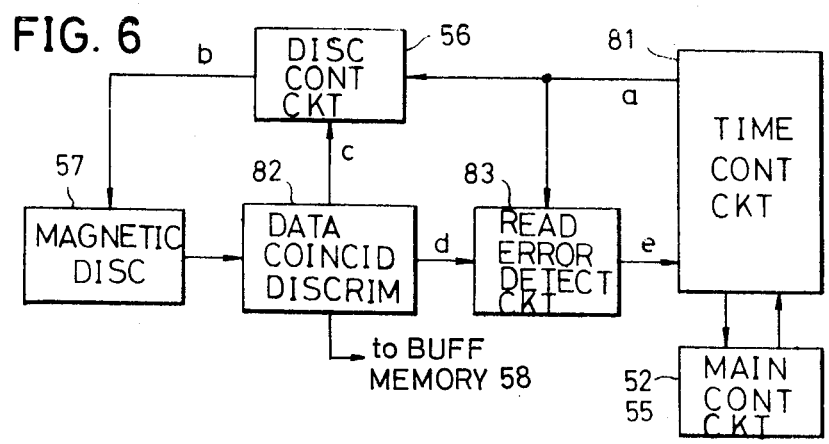
FIG. 6 is a block systematic diagram showing the other embodiment of a reading out part for the memory apparatus.

In this case, the teaching operator manipulates to open the teaching switch 35 and to close the playback start switch 19. The opening of the teaching switch 35 causes the solenoid valve 74 to close through the control board 41. The closing signal of the playback start switch 19 is supplied through the barrier circuit 51 to the main control circuit 52. Then the closing signal takes priority to the teaching mode signal thereby generating the signal which is the same as that generated when the mode-selecting switch 53 is changed over to the playback mode side 53b. Accordingly, the robot now assumes the playback or reproducing state, in spite of the teaching mode being still continued. The servo valve 63 is therefore controlled in accordance with the reproduced contents from the magnetic disc 57, similarly as in the normal playback mode operation described hereinbefore. Accordingly, the movable part 65 initiates displacement thereof from the starting position X1 of the curve I as indicated in FIG. 5B.

The teaching operator observes the movement of the movable part 65 and manipulates the playback stop switch 20 whereupon the movable part 65 arrives at the displaced position X2 and deviates from the curves I and II into a curve III. The playback stop signal is then supplied through the main control circuit 52 to the main control circuit 55. The disc control circuit 56 operates, in response to the signal from the main control circuit 55, to stop or suspend reading out operation of the magnetic disc 57. The buffer memory 58 stores the information signal (position signal) at a time point t1 when the reading out operation of the magnetic disc 57 is stopped by the signal from the main control circuit 55, and operates to continue to send out this stored signal to the comparator 60 by way of the D/A converter 59. For this reason, the servo system including the comparator 60, the servo amplifier 61, the servo valve 63, the hydraulic cylinder 64, and the position detector 66 operates in such a manner that the movable part 65 continues to stop at the position X2, then the robot structure 10 stops temporarily.

The teaching operator then pushes again the teaching switch 35 at the time point t2, thereby to cause the solenoid valve 74 to be closed for terminating the supply of the pressurized oil to the servo valve 63. Thus, the movable part 65 can be moved again. The magnetic disc 57 becomes to be in a recordable state. Thereafter, the teaching operator moves the movable part 65 along a correct displacement path from the position X2 to the position X3 as indicated by the curve II. The information signal indicated by the curve II is recorded on the magnetic disc 57 following the information signal of the curve I, with erasing the error information signal of the curve III. Since the recording operation on the magnetic disc 57 is not carried out between the time points t1 and t2, the correct information signals of displacement indicated by curves I and II in FIG. 5A are memorized as a result.

As described hereinbefore, when the teaching correction is to be carried out, only the re-teaching from the halfway point of the teaching operation is required with respect to the part of the curve III. Therefore, there is not necessitated to re-teach totally from the beginning of the curve I as in the case of the conventional robot. The teaching correction operation can be carried out with extreme ease and without any wastes of time and labor.

Since the switches 18 through 21 and 35 related to the teaching operation and the teaching correction operation are not provided on the control board 41 but on the robot structure 10, the teaching operator is not required to go and come back between the robot structure 10 and the control board 41 every time when the teaching operation or teaching correction operation is performed, whereby the work is carried out easily and in a short period of time.

Whenever the emergency stop switch 21 is pushed during the playback operation, an emergency stop signal is generated from the main control circuit 52 to close the solenoid valve 75, irrespective of the playback mode for correcting teaching or a normal playback mode. As a result of it, the pressurized oil from the pump 73 is prevented from supplying to the robot structure 10, and the movable part 65 therefore stops its motion instantaneously.

The operation panel 54 is also provided with a switch (not shown) adapted to change a sampling cycle for reading out from the magnetic disc 57 and to change variably the moving speed of the movable part 64, and a main power supply source switch (not shown), and the like.

In the above described embodiment, the pressurized oil is utilized for actuating the cylinders 23, 26, and 28, and the rotary actuators 30 and 31. However, this invention is not limited to this, the pressurized air may be used instead of the pressurized oil, and further, the cylinder and the actuator may be organized so as to be driven electrically. The position detector 66 is not limited to the potentiometer, but, instead of this, a resolver, a rotary encoder, or a differential tranceformer may be used. As a recording medium, a magnetic tape, a memory core, a magnetic drum, or a semiconductor memory may be used instead of the magnetic disc 57.

A modification is described hereinafter. The reading out time of the magnetic disc 57, which is determined principally by the moving speed of the movable part 65 and the memory capacity of the buffer memory 58, is relatively short. On one hand, the speed of teaching by moving the movable part 65 by the teaching operator and the operating speed of the movable part 65 at the time of playback differ from with each other in most cases, and there arise the case where the operation speed at the playback mode should be varied, depending on the kinds of work. In these cases, the reading out time of the buffer memory 58 should be variably changed. A discrimination of reading error has been made by restricting the reading number within the reading time of the magnetic disc 57 to one, for instance, and when the data is not read correctly within the reading time, the emergency stop takes place, irrespective of whether the robot is in the teaching mode or in the playback mode.

The robot is accompanied by a restriction that the work should be finished within a certain time interval. Further, in the robot wherein reading time is variably changed, when the reading number of times is limited, it is determined by a minimum reading time. For this reason, in the case where the reading time becomes longer, the time is not utilized effectively because, after a minimum reading time (constant) elapses, the reading operation is not carried out and whereby the time is wasted. Further, since the minimum time allowed for reading should be exactly calculated, the circuit design becomes complicated. Still further, a circuit for calculating the reading number of times should be incorporated, the robot therefore becomes inevitably expensive.

An embodiment described hereinbelow is of overcoming the above described difficulties and will now be described in conjunction with FIG. 6 and FIGS. 7(A) through 7(E).

The time control circuit 81 is connected to the main control circuits 52 and 55 and is adapted to change the sampling cycle in accordance with the instruction from the operation panel 54 and to send an instruction signal for reading out to the disc control circuit 56.

A data coincidence discrimination circuit 82 operates to discriminate whether the address of the data read out from the magnetic disc 52 in response to the reading instruction from the disc control circuit 56 is that of the desired data or not. If the result of discrimination is "no", the reading from the magnetic disc 57 is repeated. When the coincidence takes place, the read out data are transferred to the buffer memory 58. A reading error detection circuit 83 operates to make AND operation of the output signals of the data coincidence discrimination circuit 82 and the time control circuit 81. When a succeeding instruction signal for reading out from the time control circuit 81 is sent to the disc control circuit 56, while the data coincidence discrimination circuit 82 continues to read out, an emergency stop is carried out, whereby the movable part 65 is held in its state and the alarm is indicated on the operation panel 54.

Figure 7:
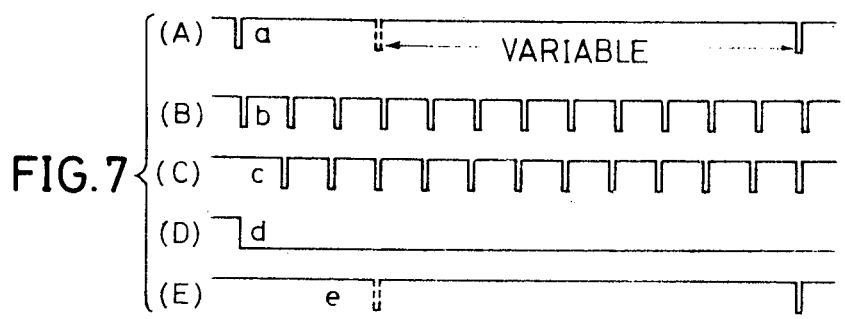
FIG. 7(A) through FIG. 7(E) are respectively signal waveform diagrams for explaining the operation of the block system of FIG. 6.

When the memorized information is to be read out in accordance with the necessity and a control signal is to be sent to the servo valve 63, a low-level reading instruction signal a as indicated by a full line in FIG. 7(A) from the time control circuit 81 is fed to the disc control circuit 56 and the reading error detection circuit 83 respectively. The disc control circuit 56 operates, in response to the reception of the reading instruction signal a, to send read starting instruction signal b of low level as indicated in FIG. 7(B) to the magnetic disc 57. By the instruction signal b, a recording and reproducing head for the magnetic disc 57 reads out the address (track number and address mark) corresponding to the program number. If the head fails to read out the track number, the recording and reproducing of data respectively becomes impossible. At that time a reading error has taken place. Moreover, if the magnetic head fails to read out the address mark which has been recorded previously at the biginning of a portion divided into four sector in each track. At that time, a reading error also has taken place. In the case of reproduction, errors in parity check or in block check also becomes the reading errors.

These errors are considered to generate or occur in such a case where dusts enter between the recording and reproducing head and the disc, or where random electric noises over several microseconds are generated. The existence or non-existence of these errors is observed and discriminated by the data coincidence discrimination circuit 82. The discrimination circuit 82, in the case where the read out data (address) is not correct, not only applies a low-level non-coincidence signal c as indicated in FIG. 7(C) to the disc control circuit 56, but also continues to supply a low-level reading signal d as indicated in FIG. 7(D) to a read error detection circuit 83 until the data is read correctly. The disc control circuit 56 operates to apply the read starting instruction signal b to the magnetic disc 57, whereupon it receives the above described data non-coincidence signal c. Similar operation is repeated thereafter. That is, the read starting instruction signals b are generated in repetition as indicated in FIG. 7(B) until the data is read correctly, during the interval until the succeeding read instruction signal a is introduced. The read error detection circuit 83 sends a low-level read error signal e as indicated by a full or broken line in FIG. 7(E) to the time control circuit 81, only in the case where it being received with the reading signal d from the data coincidence discrimination circuit 82 at the time when the above described succeeding reading instruction signal a is introduced, that is, only when AND operation is performed. This means that a correct data is not read during the interval from the introduction of the first reading instruction signal a to the introduction of the next reading instruction signal a, and the robot structure 10 is subjected to an emergency stop.

The reading instruction signal a indicated by a dotted-line in FIG. 7(A) represents that the period thereof is variable. Accordingly, since the reading operation is repeated irrespective of long or short period, the waste of time for reading is completely eliminated. The allowable repetitive reading number of times is therefore determined by a period of reading instruction signal a, and becomes twelve times in the case where the sampling interval is 1/20 second, and becomes three times when the sampling interval is 1/80 second, for example. The period of the reading instruction signal a is determined by the sampling interval and the memorizing capacity of the buffer memory 58.

Further, this invention is not limited to these embodiments but various variations and modifications may be made without departing from the scope and spirit of the invention.

What is claimed is:

1. An industrial robot comprising: a robot structure having a movable part; driving means for driving said movable part; detection means for detecting substantially a displacement of said movable part and for generating a position detection signal; memory means for memorizing the signal from said detection means and reading out the signal thus memorized; control means for controlling a memorizing operation and reading out operation of said memory means and for controlling said driving means responsive to the signal read out from said memory means; teaching mode operation means which is manipulated to assume a teaching operation mode and applies a teaching mode signal to said control means, said control means being responsive to said teaching mode signal and producing a signal for causing said memory means to memorize and a signal for controlling said driving means so as to be noload with respect to said movable part; normal playback mode manipulation means which is manipulated so as to assume a normal playback operation mode and applies a playback mode signal to said control means, said control means being responsive to said playback signal and producing a signal for causing said memory means to perform a reading out operation and a signal for causing said driving means to make an operational state; another playback mode manipulating means which is manipulated so as to assume a playback operation during the teaching mode exclusively and applies a playback mode signal to said control means prior to the teaching mode signal; and playback stop means which is manipulated to stop said playback operation temporarily during the teaching mode and applies a playback stop signal to said control means, said control means being responsive to said playback stop signal and sending to said memory means a signal for stopping the reading out operation thereof, said memory means, after a stop of playback, continuing to memorize the signal from said detection means following the memorized signal preceding to the stop of playback in the teaching operation mode.

2. An industrial robot as claimed in claim 1, wherein said driving means comprises: a driving mechanism for driving said movable part; a driving power supply source for actuating or driving said driving mechanism; and a control part responsive to said control means for controlling said driving power supply source for driving said driving mechanism said driving power source being responsive to the signal from said control means and not imparting the driving force to said driving mechanism in the teaching operation but imparting the driving force to said driving mechanism in the playback operation, said driving power source, when the playback is being stopped temporarily, maintaining a state of imparting the driving force to said driving mechanism for holding said movable part at the position whereupon the playback is stopped temporarily.

3. An industrial robot as claimed in claim 1, including a control board disposed at a position apart from said robot structure; said teaching mode manipulation means comprising a teaching operation mode selection switch and a teaching start manipulation switch; said normal playback mode manipulation means comprising a playback operation mode selection switch; said another playback mode manipulation means comprising a playback start manipulation switch; said playback stop means comprising a playback stop manipulation switch; said teaching operation mode selection switch and said playback operation mode selection switch being on said control board; said teaching start manipulation switch and said playback start manipulation switch and said playback mode manipulation switch being on said robot structure.

4. An industrial robot comprising: a robot structure having a movable part, said robot structure further having a driving mechanism for driving said movable part, a drive control mechanism for driving and controlling said driving mechanism, a position detector for detecting displacement of said movable part at least to send out thereby a detection signal, a teaching start manipulation switch, a playback start manipulation switch, and playback stop switch; a driving power supply source for imparting a driving force to said driving mechanism through said drive control mechanism; and a control board for controlling the operation of said robot structure and said drive source, said control board comprising memory means for memorizing an output signal of said position detector and for reading out said signal thus memorized, a selection switch for selecting a teaching operation mode or a playback operation mode, a main control circuit responsive to signals of said mode selection switch, a teaching start manipulation switch a playback start manipulation switch, and a playback stop switch on said robot structure, a memory means control circuit responsive to a signal from said main control circuit for memorizing an output signal of said position detector in the teaching operation and for reading out the memorized signal in the playback operation, and a comparator for comparing in the playback operation, the signal read out by said memory means and the output signal of said position detector and then for supplying an output error signal thus obtained as a control signal to the driving control mechanism of said robot structure, said main control circuit controlling said driving power supply source in such a manner that, to said driving mechanism the driving force is not imparted in said teaching operation, and is imparted in said playback operation, said movable part being held at its displaced position whereupon the playback operation is stopped temporarily for correcting teaching by the manipulation of the playback stop switch, and said main control circuit further sending a main control signal so as to stop a reading out operation of said memory means whereupon said playback operation is stopped temporarily, and to carry out memorizing by said memory means following the memorized signal which has been read out by the manipulation of said teaching manipulation switch.

5. An industrial robot as claimed in claim 3 wherein said robot structure further comprises a platform for supporting said movable part, said teaching start manipulation switch being disposed in the vicinity of the distal end of said movable part, and said playback start manipulation switch and said playback stop manipulation switch being provided on said platform.

6. An industrial robot as claimed in claim 5 wherein said movable part is provided with grips manually operated to move said movable part, and said teaching start manipulation switch being provided in said grips.

7. An industrial robot as claimed in claim 4 which further comprises: a coincidence discrimination circuit for discriminating the truth or error of the signal read out from said memory means and operating to send a re-read instruction signal to said memory means control circuit in the case of reading of error signal and to send the signal thus read out to said comparator in the case of truth signal; and an error read detection circuit, with being supplied with the reading instruction signal from said main control circuit and a signal which is of error signal of said coincidence discrimination circuit, for sending a signal for causing said driving power supply source to stop to said main control circuit whereupon a signal from said coincidence discrimination circuit is supplied over a period exceeding a period of said read instruction signal.

* * * * *